United States Patent
Liu (10) Patent No.: US 10,360,273 B2
(45) Date of Patent: Jul. 23, 2019

(54) METHOD AND APPARATUS FOR RECOMMENDING BUDDIES TO A CLIENT USER

(71) Applicant: TENCENT TECHNOLOGY (SHENZHEN) COMPANY LIMITED, Shenzhen (CN)

(72) Inventor: Jianzhong Liu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 397 days.

(21) Appl. No.: 15/003,912

(22) Filed: Jan. 22, 2016

(65) Prior Publication Data

US 2016/0140246 A1 May 19, 2016

Related U.S. Application Data

(63) Continuation of application No. PCT/CN2014/082863, filed on Jul. 24, 2014.

(30) Foreign Application Priority Data

Aug. 19, 2013 (CN) .......................... 2013 1 0362415

(51) Int. Cl.
*G06F 17/30* (2006.01)
*G06F 16/9535* (2019.01)
(Continued)

(52) U.S. Cl.
CPC ......... *G06F 16/9535* (2019.01); *G06Q 30/02* (2013.01); *G06Q 50/01* (2013.01)

(58) Field of Classification Search
CPC .......... G06F 17/30867; G06F 16/9535; G06Q 30/02; G06Q 50/01
See application file for complete search history.

(56) References Cited

U.S. PATENT DOCUMENTS 8,666,979 B2 * 3/2014 Chen ..................... G06F 16/335
707/732
8,977,611 B2 * 3/2015 Tseng ................ G06F 17/30722
705/319

(Continued)

FOREIGN PATENT DOCUMENTS

CN 101534207 A 9/2009
CN 101916286 A 12/2010

(Continued)

OTHER PUBLICATIONS

Search Report in International Application No. PCT/CN2014/082863 dated Oct. 27, 2014, 2 pages.

(Continued)

*Primary Examiner* — Huawen A Peng
(74) *Attorney, Agent, or Firm* — Brinks, Gilson & Lione (57) ABSTRACT

According to various embodiments of the present disclosure, an electronic device analyzes shared contents of all members in a circle created by a client user and generates feature information of the circle. The electronic device analyzes shared contents of each member in a buddy list created by the client user and generates feature information of each member in the buddy list. The electronic device calculates a similarity between the feature information of each member in the buddy list and the feature information of the circle, generates a similarity set, and generates a recommended buddy of the circle based on the similarity set. The electronic device prompts the recommended buddy of the circle to the client user.

10 Claims, 8 Drawing Sheets

(51) Int. Cl.
*G06Q 50/00* (2012.01)
*G06Q 30/02* (2012.01)

(56) References Cited

U.S. PATENT DOCUMENTS

| | | | |
|---|---|---|---|
| 9,743,157 B2* | 8/2017 | Archibong | H04N 21/8133 |
| 2011/0153740 A1 | 6/2011 | Smith et al. | |
| 2011/0270774 A1* | 11/2011 | Varshavsky | G06Q 10/10 |
| | | | 705/319 |
| 2012/0023165 A1 | 1/2012 | Li | |
| 2013/0031173 A1 | 1/2013 | Deng | |
| 2013/0097180 A1* | 4/2013 | Tseng | G06F 17/30722 |
| | | | 707/748 |

FOREIGN PATENT DOCUMENTS

| | | | |
|---|---|---|---|
| CN | 102347963 A | | 2/2012 |
| CN | 102668514 A | | 9/2012 |
| CN | 102790707 A | * | 11/2012 |
| CN | 102790707 A | | 11/2012 |
| CN | 103200279 A | | 7/2013 |
| WO | WO 2011/076070 A1 | | 6/2011 |

OTHER PUBLICATIONS

International Preliminary Report on Patentability and Written Opinion in International Application No. PCT/CN2014/082863 dated Feb. 23, 2016, 6 pages.

Search Report received from the State Intellectual Property Office of People's Republic of China for Application No. 2013103624159 dated Jul. 9, 2018 (Chinese language only) (6 pp.).

* cited by examiner

METHOD AND APPARATUS FOR RECOMMENDING BUDDIES TO A CLIENT USER

CROSS-REFERENCE TO RELATED APPLICATIONS

This application is a continuation of International Patent Application No. PCT/CN2014/082863, filed Jul. 24, 2014. This application claims the benefit of Chinese Patent Application No. 201310362415.9, filed Aug. 19, 2013. The entire disclosures of each of the above applications are incorporated herein by reference.

FIELD

Various example embodiments of the present disclosure relate to Internet technology, and more particularly, to a method and apparatus for recommending buddies to a client user.

BACKGROUND

With the advent of the mobile Internet era, social sharing applications (such as micro-blog, We Chat) are emerging. Through a social sharing application, a user registered on a client of the social sharing application (hereinafter referred to as a client user) may not only create a buddy list to exchange information among buddies, but also may create one or more buddy circles to exchange information among buddies within a buddy circle (hereinafter may be referred to as a circle). The circle may mean a sharing platform provided by the social sharing application. Based on the circle, the client user may share his own information or view shared information posted by the buddies of the client user. Currently, the buddies within the circle may be initiatively added by the client user who creates the circle, or may be selected from recommended buddies of the circle whom are prompted from the background.

Usually, there are two ways used when the background prompts the recommended buddies of the circle to the client user creating the circle. The first way is to recommend a newly-registered user. According to the first way, when there is a user newly registered on the social sharing application in a relationship chain (such as an address book relationship chain, a micro-blog relationship chain, an instant messaging relationship chain, etc.) of the client user creating the circle, the newly-registered user is prompted to the client user creating the circle as a recommended buddy of the circle. The second way is to recommend a user through a random selection way. According to the second way, a user is randomly selected, at a certain interval, from the buddy list of the client user creating the circle and is prompted to the client user creating the circle as a recommended buddy of the circle.

SUMMARY

According to various embodiments of the present disclosure, a method and apparatus for recommending a buddy to a client user are described, so that the recommendation mechanism is more comprehensive and reliable, and excessive system resource waste caused by too many invalid recommendations is avoided.

According to various embodiments of the present disclosure, a method for recommending a buddy to a client user is described. The method includes:

analyzing, by an electronic device, shared contents of all members in a circle created by a client user and generating feature information of the circle;

analyzing, by the electronic device, shared contents of each member in a buddy list created by the client user and generating feature information of each member in the buddy list;

calculating, by the electronic device, a similarity between the feature information of each member in the buddy list and the feature information of the circle, generating a similarity set, and generating a recommended buddy of the circle based on the similarity set; and prompting, by the electronic device, the recommended buddy of the circle to the client user.

According to various embodiments of the present disclosure, an apparatus for recommending a buddy to a client user is described. The apparatus includes:

a first feature information generating module, configured to analyze shared contents of all members in a circle created by a client user and generate feature information of the circle;

a second feature information generating module, configured to analyze shared contents of each member in a buddy list created by the client user and generate feature information of each member in the buddy list;

a buddy generating module, configured to calculate a similarity between the feature information of each member in the buddy list and the feature information of the circle, generate a similarity set, and generate a recommended buddy of the circle based on the similarity set; and a buddy recommending module, configured to prompt the recommended buddy of the circle to the client user.

According to the technical scheme described in various embodiments of the present disclosure, the similarity between the feature information of each member in the buddy list and the feature information of the circle is calculated and the recommended buddy of the circle is generated according to the similarity. Therefore, it is more likely for the client user creating the circle to add the recommended buddy to the circle. As such, the recommendation mechanism is more comprehensive and reliable, and excessive system resource waste caused by too many invalid recommendations is avoided.

BRIEF DESCRIPTION OF THE DRAWINGS

Features of the present disclosure are illustrated by way of example and not limited in the following figures, in which like numerals indicate like elements, in which.

DETAILED DESCRIPTION

Hereinafter, the present disclosure will be described in further detail with reference to the accompanying drawings and example embodiments.

For simplicity and illustrative purposes, the present disclosure is described by referring to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on. In addition, the terms "a" and "an" are intended to denote at least one of a particular element.

During the researching on the prior art, it is found that the prior art has at least the following issues. That is, the correlation between a recommended buddy of a circle whom is prompted by the background and a buddy member within the circle is very low and the possibility for a client user creating the circle to add the recommended buddy of the circle to the circle is very small, therefore the recommendation mechanism is unreliable and excessive system resource waste is caused by too many invalid recommendations.

In view of the above, various embodiments of the present disclosure describe a method and apparatus for recommending a buddy to a client user. According to the method and apparatus described in the various embodiments of the present disclosure, a similarity between feature information of each member in a buddy list and feature information of a circle is calculated and a recommended buddy of the circle is generated according to the similarity. Therefore, it is more likely for a client user creating the circle to add the recommended buddy to the circle. As such, the recommendation mechanism is more comprehensive and reliable, and excessive system resource waste caused by too many invalid recommendations is avoided.

Figure 1:
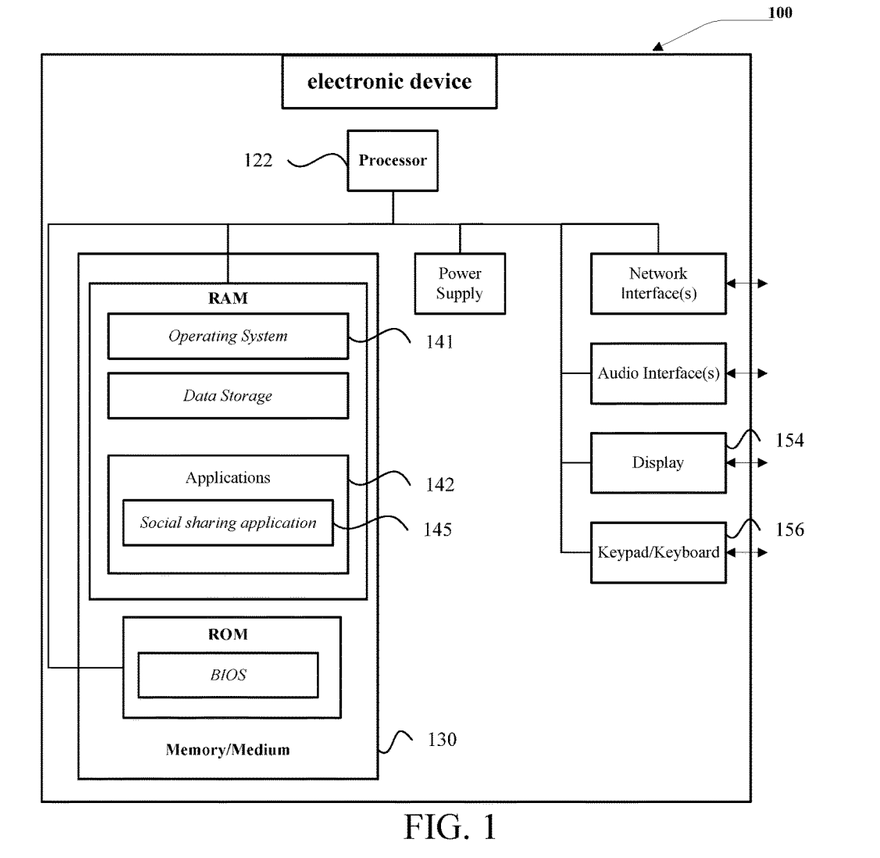
FIG. 1 is a diagram illustrating an electronic device, according to various embodiments of the present disclosure.

FIG. 1 is a diagram illustrating an electronic device, according to an embodiment of the present disclosure. The electronic device 100 as shown in FIG. 1 may be a computing device capable of executing the method and apparatus described later and provided by various embodiments of the present disclosure. The electronic device 100 may, for example, be a device such as a personal desktop computer or a portable device, such as a laptop computer, a tablet computer, a cellular telephone, or a smart phone. The electronic device 100 may also be a server device that connects to the above devices locally or via a network.

The electronic device 100 may vary in terms of capabilities or features. Claimed subject matter is intended to cover a wide range of potential variations. For example, the electronic device 100 may include a keypad/keyboard 156. It may also include a display 154, such as a liquid crystal display (LCD), or a display with a high degree of functionality, such as a touch-sensitive color 2D or 3D display. In contrast, however, as in another example, a web-enabled electronic device 100 may include one or more physical or virtual keyboards, and mass storage medium 130.

The electronic device 100 may also include or may execute a variety of operating systems 141, including an operating system, such as a Windows™ or Linux™, or a mobile operating system, such as iOS™, Android™, or Windows Mobile™ The electronic device 100 may include or may execute a variety of possible applications 142, such as a social sharing application 145. An application 142 may enable communication with other devices via a network, such as communicating with another computer via an Internet network.

Further, the electronic device 100 may include Memory or Medium 130, such as one or more non-transitory processor-readable storage media and one or more processors 122 in communication with the non-transitory processor-readable storage media 130. For example, the non-transitory processor-readable storage media 130 may include a RAM memory, flash memory, ROM memory, EPROM memory, EEPROM memory, registers, hard disk, a removable disk, a CD-ROM, or any other form of non-transitory storage medium known in the art. The one or more non-transitory processor-readable storage media 130 may store sets of instructions, or units and/or modules that include the sets of instructions, for conducting operations described in the present disclosure. The one or more processors may be configured to execute the sets of instructions and perform the operations in the example embodiments of the present disclosure.

Merely for illustration, only one processor may be described in the electronic device 100 that executes operations and/or method steps in the following examples. However, it should be noted that the electronic device 100 in the present disclosure may also include multiple processors, thus operations and/or method steps that are performed by one processor as described in the present disclosure may also be jointly or separately performed by the multiple processors. For example, if in the present disclosure a processor of a client device executes both step A and step B, it should be understood that step A and step B may also be performed by two different processors jointly or separately in the client device (e.g., the first processor executes step A and the second processor executes step B, or the first and second processors jointly execute steps A and B).

Figure 2:
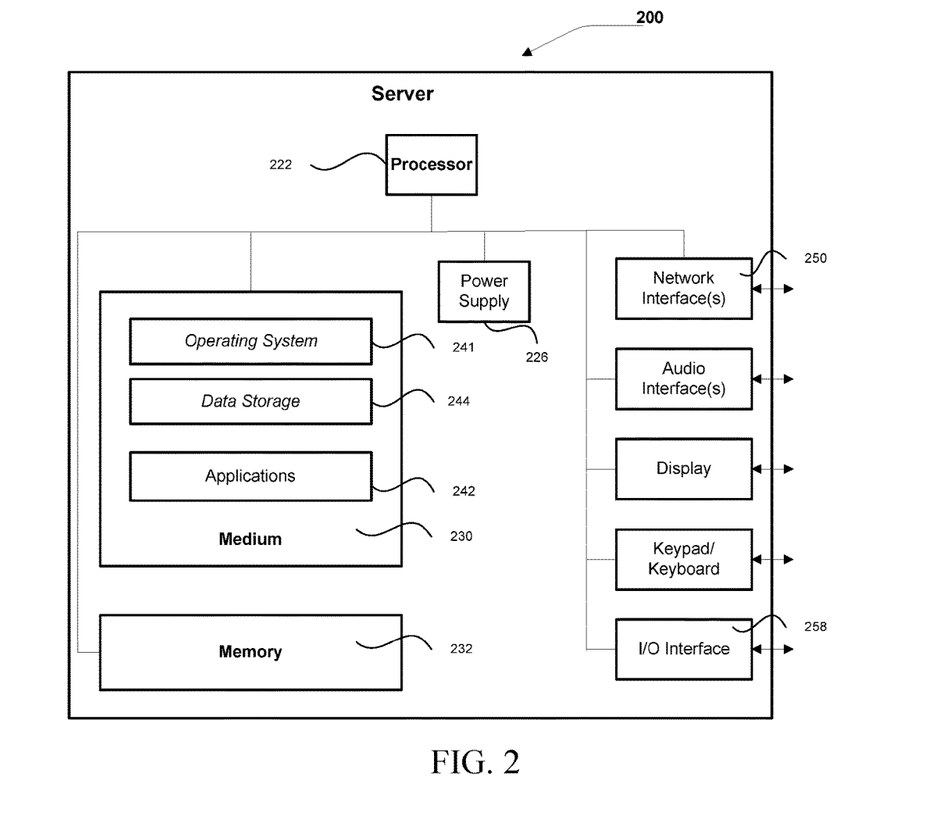
FIG. 2 is a diagram illustrating a server device, according to various embodiments of the present disclosure.

FIG. 2 is a diagram illustrating a server device, according to an embodiment of the present disclosure. The server 200 as shown in FIG. 2 may manage social sharing applications and may be capable of executing the method and apparatus described later and provided by various embodiments of the present disclosure. The server 200 may vary widely in configuration or capabilities, but it may include one or more central processing units 222 and memory 232, one or more medium 230 (such as one or more mass storage devices) storing application programs 242 or data 244, one or more power supplies 226, one or more wired or wireless network interfaces 250, one or more input/output interfaces 258, and/or one or more operating systems 241, such as Windows Server™, Mac OS X™, Unix™, Linux™, FreeBSD™, or the like. The server 200 may include, for example, dedicated rack-mounted servers, desktop computers, laptop computers, set top boxes, mobile computational devices such as smart phones, integrated devices combining various features, such as two or more features of the foregoing devices, or the like.

Figure 3:
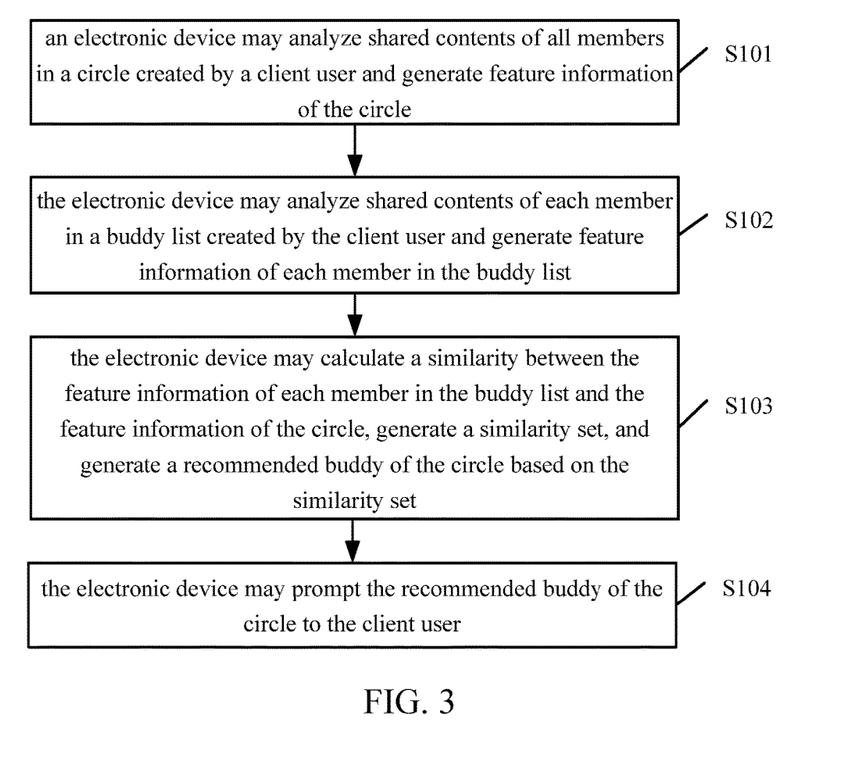
FIG. 3 is a flowchart illustrating a method for recommending a buddy to a client user, according to various embodiments of the present disclosure.

FIG. 3 is a flowchart illustrating a method for recommending a buddy to a client user, according to various embodiments of the present disclosure. The method may be applied to a terminal device where a client of a social sharing application is installed, such as the electronic device 100 described above. The method may also be applied to a server device managing social sharing applications, such as the server 200 described above. Referring to FIG. 3, the method may include following operations.

At block S101, an electronic device may analyze shared contents of all members in a circle created by a client user and generate feature information of the circle.

At block S102, the electronic device may analyze shared contents of each member in a buddy list created by the client user and generate feature information of each member in the buddy list.

At block S103, the electronic device may calculate a similarity between the feature information of each member in the buddy list and the feature information of the circle, generate a similarity set, and generate a recommended buddy of the circle based on the similarity set.

At block S104, the electronic device may prompt the recommended buddy of the circle to the client user.

In the operations at block S101, according to some embodiments of the present disclosure, through performing text analysis to the shared contents of all members in the circle created by the client user, the electronic device may extract a keyword of the shared contents of all members in the circle using a keyword extraction algorithm (e.g., a keyword extraction algorithm based on fuzzy processing, a keyword extraction algorithm based on high-dimensional clustering technology), and generate the feature information of the circle based on the extracted keyword. For example, the feature information of the circle may include extracted keywords which are different from each other and a probability of occurrence of each of the different keywords in all of the extracted keywords.

Alternatively, according to another embodiment of the present disclosure, through performing the text analysis to the shared contents of all members in the circle created by the client user, the electronic device may extract a subject term of the shared contents of all members in the circle and generate the feature information of the circle based on the subject term. For example, the feature information of the circle may include extracted subject terms which are different from each other and a probability of occurrence of each of the different subject terms in all of the extracted subject terms.

Similarly, in the operations at block S102, according to an embodiment of the present disclosure, through performing the text analysis to shared contents of a member in the buddy list created by the client user, the electronic device may extract a keyword of the shared contents of the member in the buddy list using a keyword extraction algorithm (e.g., the keyword extraction algorithm based on fuzzy processing, the keyword extraction algorithm based on high-dimensional clustering technology), and generate the feature information of the member in the buddy list based on the extracted keyword. For example, the feature information of the member in the buddy list may include keywords which are included in the shared contents of the member and are different from each other and a probability of occurrence or frequency of each of the different keywords in all of the keywords included in the shared contents of the member.

Alternatively, according to another embodiment of the present disclosure, through performing the text analysis to the shared contents of the member in the buddy list created by the client user, the electronic device may extract a subject term of the shared contents of the member in the buddy list using a keyword extraction algorithm (e.g., the keyword extraction algorithm based on fuzzy processing, the keyword extraction algorithm based on high-dimensional clustering technology), and generate the feature information of the member in the buddy list based on the extracted subject term. For example, the feature information of the member in the buddy list may include subject terms which are included in the shared contents of the member and are different from each other and a probability of occurrence or frequency of each of the different subject terms in all of the subject terms included in the shared contents of the member.

It should be noted that the process of generating the feature information of the circle and the process of generating the feature information of the member in the buddy list correspond to each other. For example, when at block S101, the feature information of the circle is generated according to the keyword extracted from the shared contents of all members in the circle, then at block S102, the feature information of the member in the buddy list is also generated according to the keyword extracted from the shared contents of the member, rather than the subject term.

According to an embodiment, a similarity between the feature information of the circle and feature information of a member in the buddy list may be a sum of products of probabilities, in which the probabilities are probabilities of occurrence of a keyword respectively in the feature information of the member in the buddy list and in the feature information of the circle and the keyword is included in both of the feature information of the member in the buddy list and the feature information of the circle. For example, assuming that keywords included in both of the feature information of the member and the feature information of the circle are "sports" and "game", a probability of occurrence of "sports" in all of keywords of the feature information of the member is p1 and a probability of occurrence of "sports" in all of keywords of the feature information of the circle is p2, a probability of occurrence of "game" in all of the keywords of the feature information of the member is p3 and a probability of occurrence of "game" in all of the keywords of the feature information of the circle is p4, then the similarity between the feature information of the circle and the feature information of the member in the buddy list is p1*p2+p3*p4. Alternatively, according to another embodiment of the present disclosure, the similarity between the feature information of the circle and the feature information of the member in the buddy list may be a calculated value in other forms, such as a sum of squares of numbers, in which the numbers are differences of probabilities of occurrence of a keyword respectively in the feature information of the member in the buddy list and in the feature information of the circle and the keyword is included in both of the feature information of the member in the buddy list and the feature information of the circle. For example, still based on the above assumption, the similarity between the feature information of the circle and the feature information of the member in the buddy list is $(p1-p2)^2+(p3-p4)^2$.

According to an embodiment, at block S103, a member in the buddy list of which a similarity included in the similarity set reaches a defined threshold may be configured as a recommended buddy of the circle.

According to another embodiment, at block S103, the similarities in the similarity set may be arranged in a descending order, and members in the buddy list corresponding to a predefined number (e.g., 10) of first similarities may be selected as recommended buddies of the circle.

According to an embodiment, the recommended buddy of the circle may be prompted to the client user through wireless or wired communication technologies.

According to the technical scheme described in various embodiments of the present disclosure, the similarity between the feature information of each member in the buddy list and the feature information of the circle is calculated and the recommended buddy of the circle is generated according to the similarity. Therefore, it is more likely for the client user creating the circle to add the recommended buddy to the circle. As such, the recommendation mechanism is more comprehensive and reliable, and excessive system resource waste caused by too many invalid recommendations is avoided.

Figure 4:
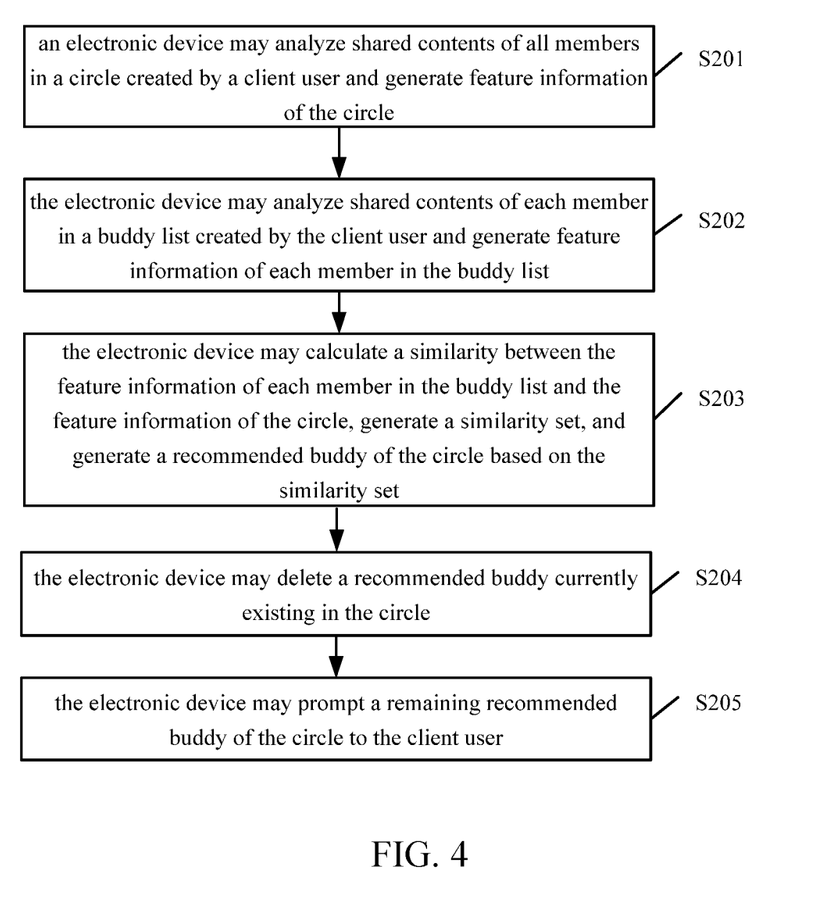
FIG. 4 is a flowchart illustrating a method for recommending a buddy to a client user, according to various embodiments of the present disclosure.

FIG. 4 is a flowchart illustrating a method for recommending a buddy to a client user, according to various embodiments of the present disclosure. The method may be applied to a terminal device where a client of a social sharing application is installed, such as the electronic device 100 described above. The method may also be applied to a server device managing social sharing applications, such as the server 200 described above. Referring to FIG. 4, the method may include following operations.

At block S201, an electronic device may analyze shared contents of all members in a circle created by a client user and generate feature information of the circle.

According to an embodiment of the present disclosure, the operations at block S201 may further include following sub-operations.

At sub-operation A1, the electronic device may obtain the shared contents of all members in the circle created by the client user and configure the shared contents as circle shared contents.

At sub-operation A2, the electronic device may perform context analysis to the circle shared contents and extract a keyword included in the circle shared contents.

At sub-operation A3, the electronic device may generate the feature information of the circle according to the keyword included in the circle shared contents.

At block S202, the electronic device may analyze shared contents of each member in a buddy list created by the client user and generate feature information of each member in the buddy list.

According to an embodiment of the present disclosure, the operations at block S202 may further include following sub-operations.

At sub-operation B1, the electronic device may obtain the shared contents of each member in the buddy list created by the client user.

At sub-operation B2, the electronic device may perform the context analysis to the shared contents of each member in the buddy list and extract a keyword included in the shared contents of each member.

At sub-operation B3, the electronic device may generate the feature information of each member in the buddy list according to the keyword included in the shared contents of each member in the buddy list.

At block S203, the electronic device may calculate a similarity between the feature information of each member in the buddy list and the feature information of the circle and generate a similarity set, and generate a recommended buddy of the circle based on the similarity set.

At block S204, the electronic device may delete a recommended buddy currently existing in the circle.

At block S205, the electronic device may prompt a remaining recommended buddy of the circle to the client user after the deleting operation.

At the sub-operations A1 and B1, when the method is applied to the terminal device where the client of the social sharing application is installed, the terminal device obtains, from the client user, the shared contents of all members in the circle created by the client user and the shared contents of each member in the buddy list created by the client user that are sent from the server managing the social sharing applications. When the method is applied to the server managing the social sharing applications, the server directly obtains, from a local storage of the server, the shared contents of all members in the circle created by the client user and the shared contents of each member in the buddy list created by the client user.

According to an embodiment of the present disclosure, the feature information of the circle is defined by formula (1):

$$U=\{(\omega_i, cnt_i/cnt) | 1 <= i <= a\} \quad (1)$$

among them, U is the feature information of the circle, $\omega_i$ is the i-th keyword in different keywords included in the circle shared contents, $cnt_i$ is the times of occurrences of the i-th keyword in the circle shared contents, cnt is a sum of the times of occurrences of the different keywords in the circle shared contents, a is the number of the different keywords included in the circle shared contents, and i is an integer.

According to an embodiment of the present disclosure, the feature information of the k-th member in the buddy list is defined by formula (2):

$$U_K=\{(\omega_{kj}, cnt_{kj}) | 1 <= j <= b_k\} \quad (2)$$

among them, $U_K$ is the feature information of the k-th member in the buddy list, $\omega_{kj}$ is the j-th keyword in different keywords included in the shared contents of the k-th member, $cnt_{kj}$ is the times of occurrences of the j-th keyword in the shared contents of the k-th member, $b_k$ is the number of the different keywords included in the shared contents of the k-th member, and j is an integer and k is an integer.

According to an embodiment of the present disclosure, a similarity between the feature information of the k-th member in the buddy list and the feature information of the circle is defined by formula (3):

$$S_k = \sum_m (cnt_m / cnt) \times cnt_{km} \quad (3)$$

among them, $S_k$ is the similarity between the feature information $U_K$ of the k-th member in the buddy list and the feature information U of the circle, $cnt_m$ is the times of occurrences of the m-th keyword in the circle shared contents, in which the m-th keyword is included in keywords shared by the feature information U of the circle and the feature information $U_K$ of the k-th member in the buddy list, cnt is a sum of the times of occurrences of the different keywords of the circle shared contents in the circle shared contents, $cnt_{km}$ is the times of occurrences of the m-th keyword in the shared contents of the k-th member, and m is the number of the keywords shared by the feature information U of the circle and the feature information $U_K$ of the k-th member in the buddy list.

In the embodiment, the process of generating the recommended buddy of the circle according to the similarity set may refer to the corresponding description in the aforementioned embodiments.

According to various embodiments of the present disclosure, when the recommended buddies of the circle are generated according to the similarity set, the electronic device may search the generated recommended buddies for a member who has already existed in the circle. Then, the electronic device may delete the member who has already existed in the circle and is searched out from the generated recommended buddies.

According to an embodiment of the present disclosure, the recommended buddy of the circle may be prompted to the client user through wireless or wired communication technologies.

According to the technical scheme described in various embodiments of the present disclosure, the similarity between the feature information of each member in the buddy list and the feature information of the circle is calculated and the recommended buddy of the circle is generated according to the similarity. Therefore, it is more likely for the client user creating the circle to add the recommended buddy to the circle. As such, the recommendation mechanism is more comprehensive and reliable, and excessive system resource waste caused by too many invalid recommendations is avoided. In addition, the member who has already existed in the circle is deleted from the recommended buddy and the remaining recommended buddy of the circle after the deleting operation is prompted to the client user. As such, the system resource waste caused by repeated recommendations is avoided.

Figure 5:
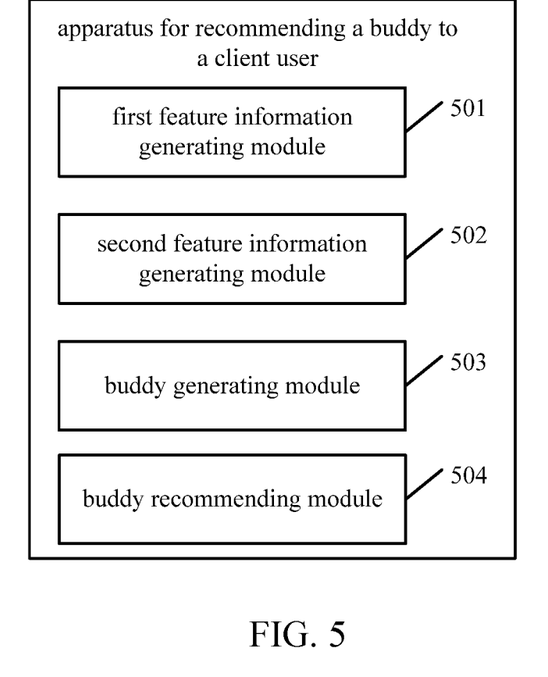
FIG. 5 is a diagram illustrating a structure of an apparatus for recommending a buddy to a client user, according to various embodiments of the present disclosure.

FIG. 5 is a diagram illustrating a structure of an apparatus for recommending a buddy to a client user, according to various embodiments of the present disclosure. As shown in FIG. 5, the apparatus may include following modules:

a first feature information generating module 501, configured to analyze shared contents of all members in a circle created by a client user and generate feature information of the circle;

a second feature information generating module 502, configured to analyze shared contents of each member in a buddy list created by the client user and generate feature information of each member in the buddy list;

a buddy generating module 503, configured to calculate a similarity between the feature information of each member in the buddy list and the feature information of the circle, generate a similarity set, and generate a recommended buddy of the circle based on the similarity set; and a buddy recommending module 504, configured to prompt the recommended buddy of the circle to the client user.

According to some embodiments of the present disclosure, through performing text analysis to the shared contents of all members in the circle created by the client user, the first feature information generating module 501 may extract a keyword of the shared contents of all members in the circle using a keyword extraction algorithm (e.g., a keyword extraction algorithm based on fuzzy processing, a keyword extraction algorithm based on high-dimensional clustering technology), and generate the feature information of the circle based on the extracted keyword. For example, the feature information of the circle may include extracted keywords which are different from each other and a probability of occurrence of each of the different keywords in all of the extracted keywords.

Alternatively, according to another embodiment of the present disclosure, through performing the text analysis to the shared contents of all members in the circle created by the client user, the first feature information generating module 501 may extract a subject term of the shared contents of all members in the circle and generate the feature information of the circle based on the subject term. For example, the feature information of the circle may include extracted subject terms which are different from each other and a probability of occurrence of each of the different subject terms in all of the extracted subject terms.

Similarly, according to an embodiment of the present disclosure, through performing the text analysis to shared contents of a member in the buddy list created by the client user, the second feature information generating module 502 may extract a keyword of the shared contents of the member in the buddy list using a keyword extraction algorithm (e.g., the keyword extraction algorithm based on fuzzy processing, the keyword extraction algorithm based on high-dimensional clustering technology), and generate the feature information of the member in the buddy list based on the extracted keyword. For example, the feature information of the member in the buddy list may include keywords which are included in the shared contents of the member and are different from each other and a probability of occurrence or frequency of each of the different keywords in all of the keywords included in the shared contents of the member.

Alternatively, according to another embodiment of the present disclosure, through performing the text analysis to the shared contents of the member in the buddy list created by the client user, the second feature information generating module 502 may extract a subject term of the shared contents of the member in the buddy list using a keyword extraction algorithm (e.g., the keyword extraction algorithm based on fuzzy processing, the keyword extraction algorithm based on high-dimensional clustering technology), and generate the feature information of the member in the buddy list based on the extracted subject term. For example, the feature information of the member in the buddy list may include subject terms which are included in the shared contents of the member and are different from each other and a probability of occurrence or frequency of each of the different subject terms in all of the subject terms included in the shared contents of the member.

It should be noted that the process of generating the feature information of the circle and the process of generating the feature information of the member in the buddy list correspond to each other. For example, when the first feature information generating module 501 generates the feature information of the circle according to the keyword extracted from the shared contents of all members in the circle, then the second feature information generating module 502 generates the feature information of the member in the buddy list according to the keyword extracted from the shared contents of the member, rather than the subject term.

According to an embodiment, a similarity between the feature information of the circle and feature information of a member in the buddy list may be a sum of products of probabilities, in which the probabilities are probabilities of occurrence of a keyword respectively in the feature information of the member in the buddy list and in the feature information of the circle and the keyword is included in both of the feature information of the member in the buddy list and the feature information of the circle. For example, assuming that keywords included in both of the feature information of the member and the feature information of the circle are "sports" and "game", a probability of occurrence of "sports" in all of keywords of the feature information of the member is p1 and a probability of occurrence of "sports" in all of keywords of the feature information of the circle is p2, a probability of occurrence of "game" in all of the keywords of the feature information of the member is p3 and a probability of occurrence of "game" in all of the keywords of the feature information of the circle is p4, then the similarity between the feature information of the circle and the feature information of the member in the buddy list is p1*p2+p3*p4. Alternatively, according to another embodiment of the present disclosure, the similarity between the feature information of the circle and the feature information of the member in the buddy list may be a calculated value in other forms, such as a sum of squares of numbers, in which the numbers are differences of probabilities of occurrence of a keyword respectively in the feature information of the member in the buddy list and in the feature information of the circle and the keyword is included in both of the feature information of the member in the buddy list and the feature information of the circle. For example, still based on the above assumption, the similarity between the feature information of the circle and the feature information of the member in the buddy list is $(p1-p2)^2 + (p3-p4)^2$.

According to an embodiment, when generating the recommended buddy of the circle according to the similarity set, the buddy generating module 503 may configure a member in the buddy list of which a similarity included in the similarity set reaches a defined threshold as a recommended buddy of the circle.

According to another embodiment, when generating the recommended buddy of the circle according to the similarity set, the buddy generating module 503 may arrange the similarities in the similarity set in a descending order, and select members in the buddy list corresponding to a predefined number (e.g., 10) of first similarities as recommended buddies of the circle.

According to an embodiment, the buddy recommending module 504 may prompt the recommended buddy of the circle to the client user through wireless or wired communication technologies.

The above-mentioned modules may be software (e.g., machine readable instructions stored in a computer readable medium and executable by a processor), hardware (e.g., the processor of an application specific integrated circuit (ASIC)), or a combination thereof.

The above-mentioned modules in the example embodiments of the present disclosure may be deployed either in a centralized or a distributed configuration; and may be either merged into a single module, or further split into a plurality of sub-modules.

Figure 6:
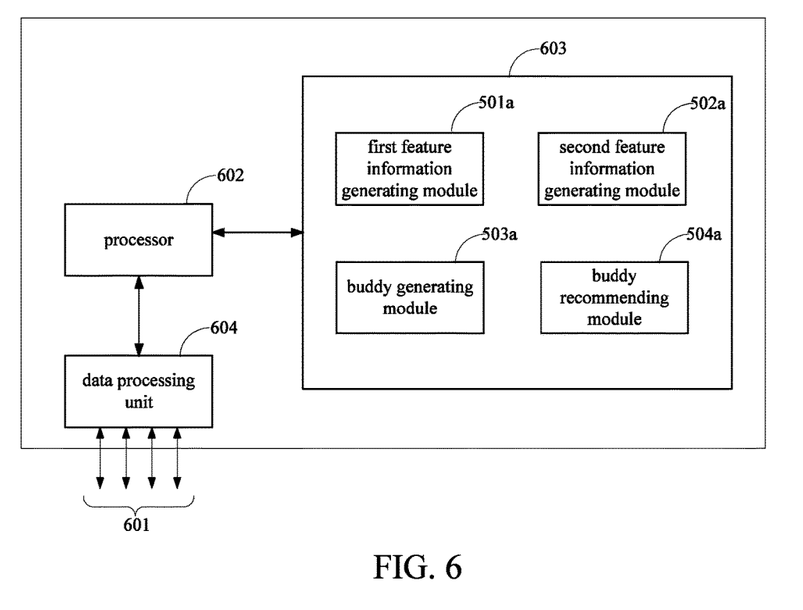
FIG. 6 is a diagram illustrating a hardware structure of an apparatus for recommending a buddy to a client user, according to various embodiments of the present disclosure.

Some embodiments of the present disclosure describe a hardware structure of the apparatus for recommending a buddy to a client user, as shown in FIG. 6. Referring to FIG. 6, the apparatus may include ports 601, a processor 602, a storage 603, and a data processing unit 604. The data processing unit 604 may transmit data information received via the ports 601 to the processor 602 for processing, and may transmit data information from the processor 602 to the ports 601 for transmitting. The storage 603 may include machine-readable instruction modules to be executed by the processor 602, in which the machine-readable instruction modules may include a first feature information generating module 501*a*, a second feature information generating module 502*a*, a buddy generating module 503*a*, and a buddy recommending module 504*a*.

Functions of the modules 501*a*-504*a* may refer to the corresponding descriptions of the modules 501-504 as described above, which are not repeated herein.

According to the technical scheme described in various embodiments of the present disclosure, the similarity between the feature information of each member in the buddy list and the feature information of the circle is calculated and the recommended buddy of the circle is generated according to the similarity. Therefore, a correlation between the recommended buddy of the circle and each member in the circle is higher and it is more likely for the client user creating the circle to add the recommended buddy to the circle. As such, the recommendation mechanism is more comprehensive and reliable, and excessive system resource waste caused by too many invalid recommendations is avoided.

Figure 7:
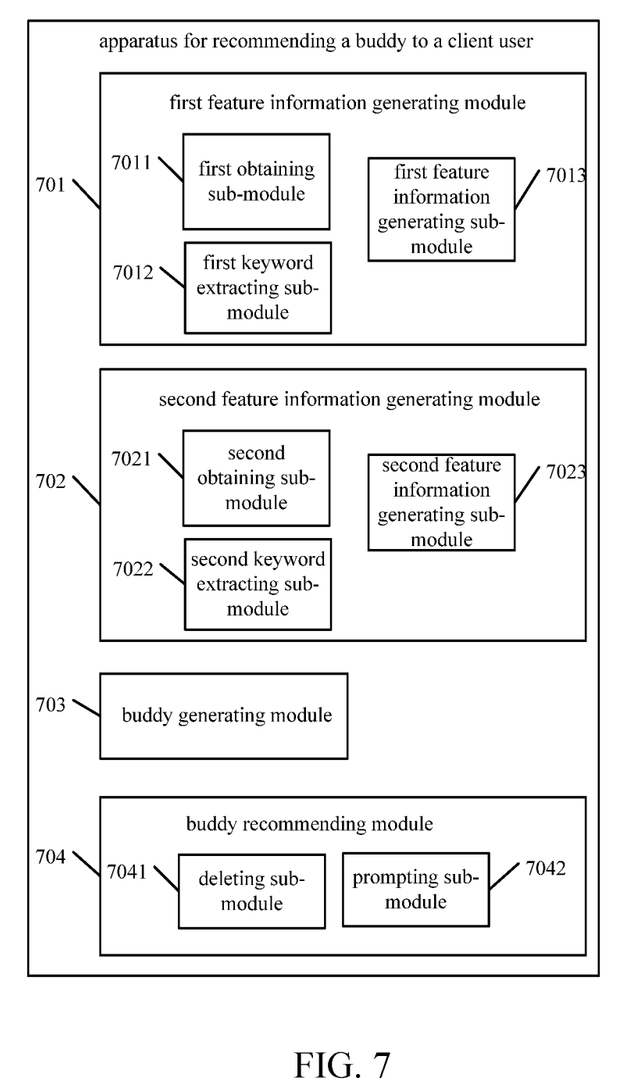
FIG. 7 is a diagram illustrating a structure of an apparatus for recommending a buddy to a client user, according to various embodiments of the present disclosure.

FIG. 7 is a diagram illustrating a structure of an apparatus for recommending a buddy to a client user, according to various embodiments of the present disclosure. As shown in FIG. 7, the apparatus may include following modules:

a first feature information generating module 701, configured to analyze shared contents of all members in a circle created by a client user and generate feature information of the circle;

a second feature information generating module 702, configured to analyze shared contents of each member in a buddy list created by the client user and generate feature information of each member in the buddy list;

a buddy generating module 703, configured to calculate a similarity between the feature information of each member in the buddy list and the feature information of the circle, generate a similarity set, and generate a recommended buddy of the circle based on the similarity set; and a buddy recommending module 704, configured to prompt the recommended buddy of the circle to the client user.

According to an embodiment of the present disclosure, the first feature information generating module 701 may further include following sub-modules:

a first obtaining sub-module 7011, configured to obtain the shared contents of all members in the circle created by the client user and take the shared contents as circle shared contents;

a first keyword extracting sub-module 7012, configured to perform context analysis to the circle shared contents and extract a keyword included in the circle shared contents; and a first feature information generating sub-module 7013, configured to generate the feature information of the circle according to the keyword included in the circle shared contents.

According to an embodiment of the present disclosure, the second feature information generating module 702 may further include following sub-modules:

a second obtaining sub-module 7021, configured to obtain the shared contents of each member in the buddy list created by the client user;

a second keyword extracting sub-module 7022, configured to perform the context analysis to the shared contents of each member in the buddy list and extract a keyword included in the shared contents of each member; and a second feature information generating sub-module 7023, configured to generate the feature information of each member in the buddy list according to the keyword included in the shared contents of each member in the buddy list.

According to an embodiment of the present disclosure, the buddy recommending module 704 may further include following sub-modules:

a deleting sub-module 7041, configure to delete a recommended buddy currently existing in the circle; and a prompting sub-module 7042, configure to prompt remaining recommended buddy to the client user after the deleting operation.

According to various embodiments of the present disclosure, when the apparatus is applied to a terminal device where a client of a social sharing application is installed, the apparatus obtains, from the client user, the shared contents of all members in the circle created by the client user and the shared contents of each member in the buddy list created by the client user that are sent from a server managing the social sharing applications. When the apparatus is applied to the server managing the social sharing applications, the apparatus directly obtains, from a local storage of the server, the shared contents of all members in the circle created by the client user and the shared contents of each member in the buddy list created by the client user.

According to an embodiment of the present disclosure, the feature information of the circle is defined by formula (1):

$$U=\{(\omega_i, cnt_i/cnt)|1<=i<=a\} \quad (1)$$

among them, U is the feature information of the circle, $\omega_i$ is the i-th keyword in different keywords included in the circle shared contents, $cnt_i$ is the times of occurrences of the i-th keyword in the circle shared contents, cnt is a sum of the times of occurrences of the different keywords in the circle shared contents, a is the number of the different keywords included in the circle shared contents, and i is an integer.

According to an embodiment of the present disclosure, the feature information of the k-th member in the buddy list is defined by formula (2):

$$U_K=\{(\omega_{kj}, cnt_{kj})|1<=j<=b_k\} \quad (2)$$

among them, $U_K$ is the feature information of the k-th member in the buddy list, $\omega_{kj}$ is the j-th keyword in different keywords included in the shared contents of the k-th member, $cnt_{kj}$ is the times of occurrences of the j-th keyword in the shared contents of the k-th member, $b_k$ is the number of the different keywords included in the shared contents of the k-th member, and j is an integer and k is an integer.

According to an embodiment of the present disclosure, a similarity between the feature information of the k-th member in the buddy list and the feature information of the circle is defined by formula (3):

$$S_k = \sum_m (cnt_m/cnt) \times cnt_{km} \quad (3)$$

among them, $S_k$ is the similarity between the feature information $U_K$ of the k-th member in the buddy list and the feature information U of the circle, $cnt_m$ is the times of occurrences of the m-th keyword in the circle shared contents, in which the m-th keyword is included in keywords shared by the feature information U of the circle and the feature information $U_K$ of the k-th member in the buddy list, cnt is a sum of the times of occurrences of the different keywords of the circle shared contents in the circle shared contents, $cnt_{km}$ is the times of occurrences of the m-th keyword in the shared contents of the k-th member, and m is the number of the keywords shared by the feature information U of the circle and the feature information $U_K$ of the k-th member in the buddy list.

In the embodiment, the process of generating the recommended buddy of the circle according to the similarity set performed by the buddy generating module 703 may refer to the corresponding description in the aforementioned embodiments.

According to various embodiments of the present disclosure, when the buddy generating module 703 generates recommended buddies of the circle according to the similarity set, the deleting sub-module 7041 may search the generated recommended buddies for a member who has already existed in the circle. Then, the deleting sub-module 7041 may delete the member who has already existed in the circle and is searched out from the generated recommended buddies.

According to an embodiment of the present disclosure, the prompting sub-module 7042 may prompt the recommended buddy of the circle to the client user through wireless or wired communication technologies.

The above-mentioned modules may be software (e.g., machine readable instructions stored in a computer readable medium and executable by a processor), hardware (e.g., the processor of an application specific integrated circuit (ASIC)), or a combination thereof.

The above-mentioned modules in the example embodiments of the present disclosure may be deployed either in a centralized or a distributed configuration; and may be either merged into a single module, or further split into a plurality of sub-modules.

Figure 8:
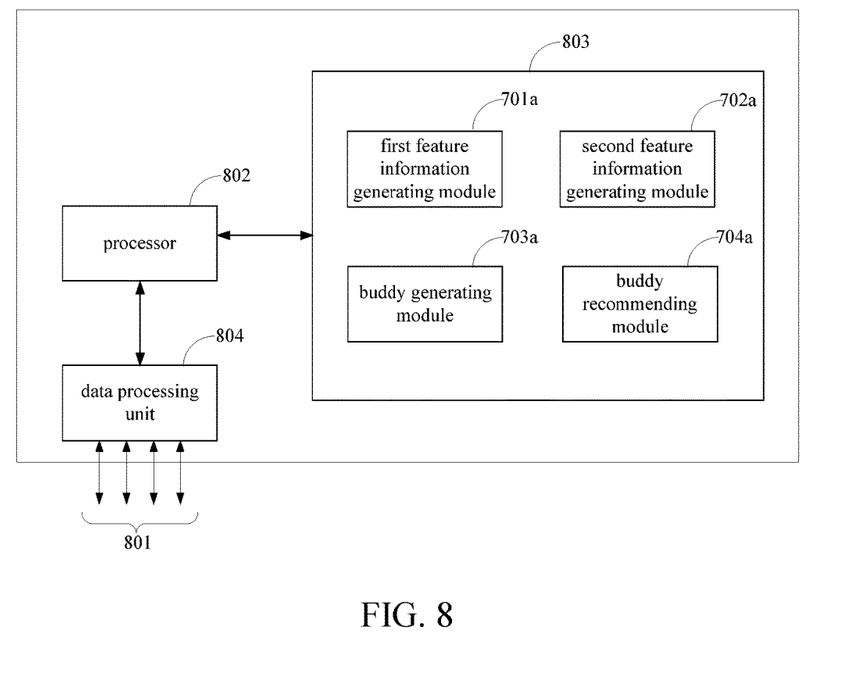
FIG. 8 is a diagram illustrating a hardware structure of an apparatus for recommending a buddy to a client user, according to various embodiments of the present disclosure.

Some embodiments of the present disclosure describe a hardware structure of the apparatus for recommending a buddy to a client user, as shown in FIG. 8. Referring to FIG. 8, the apparatus may include ports 801, a processor 802, a storage 803, and a data processing unit 804. The data processing unit 804 may transmit data information received via the ports 801 to the processor 802 for processing, and may transmit data information from the processor 802 to the ports 801 for transmitting. The storage 803 may include machine-readable instruction modules to be executed by the processor 802, in which the machine-readable instruction modules may include a first feature information generating module 701a, a second feature information generating module 702a, a buddy generating module 703a, and a buddy recommending module 704a.

Functions of the modules 701a-704a may refer to the corresponding descriptions of the modules 701-704 as described above, which are not repeated herein.

According to the technical scheme described in various embodiments of the present disclosure, the similarity between the feature information of each member in the buddy list and the feature information of the circle is calculated and the recommended buddy of the circle is generated according to the similarity. Therefore, it is more likely for the client user creating the circle to add the recommended buddy to the circle. As such, the recommendation mechanism is more comprehensive and reliable, and excessive system resource waste caused by too many invalid recommendations is avoided. In addition, the member who has already existed in the circle is deleted from the recommended buddy and the remaining recommended buddy of the circle after the deleting operation is prompted to the client user. As such, the system resource waste caused by repeated recommendations is avoided.

The above embodiments may be implemented by hardware, software or firmware, or a combination thereof. For example, the various methods, processes and functional modules described herein may be implemented by a processor (the term processor is to be interpreted broadly to include a CPU, processing unit, ASIC, logic unit, or programmable gate array, etc.). The processes, methods, and functional modules disclosed herein may all be performed by a single processor or split between several processors. In addition, reference in this disclosure or the claims to a 'processor' should thus be interpreted to mean 'one or more processors'. The processes, methods and functional modules disclosed herein may be implemented as machine readable instructions executable by one or more processors, hardware logic circuitry of the one or more processors or a combination thereof. Further the embodiments disclosed herein may be implemented in the form of a computer software product. The computer software product may be stored in a non-transitory storage medium and may include a plurality of instructions for making a computer apparatus (which may be a personal computer, a server or a network apparatus such as a router, switch, access point, etc.) implement the method recited in the embodiments of the present disclosure.

Those skilled in the art may understand that all or part of the procedures of the methods of the above embodiments may be implemented by hardware modules following machine readable instructions. The machine readable instructions may be stored in a computer readable storage medium. When running, the machine readable instructions may provide the procedures of the method embodiments. The storage medium may be diskette, CD, ROM (Read-Only Memory) or RAM (Random Access Memory), and etc.

The figures are illustrations of examples, in which the modules or procedures shown in the figures may not be necessarily essential for implementing the present disclosure. Certain procedures or modules may be omitted according to the needs. The order of the procedures is not fixed, and can be adjusted according to the needs. Those skilled in the art can understand the modules in the apparatus of embodiments of the present disclosure may be located in the apparatus as described in the embodiments, or may be located in one or more apparatuses of the embodiments of the present disclosure when modified accordingly. The modules in the aforesaid embodiments may be combined into one module or further divided into a plurality of sub-modules.

What has been described and illustrated herein is an embodiment of the disclosure along with some of its variations. The terms, descriptions and figures used herein are set forth by way of illustration only and are not meant as limitations. Many variations are possible within the spirit and scope of the disclosure, which is intended to be defined by the following claims and their equivalents, in which all terms are meant in their broadest reasonable sense unless otherwise indicated.

What is claimed is:

1. A method for recommending a buddy to a client user, comprising:

analyzing, by an electronic device, shared contents of all members in a circle created by a client user and generating feature information of the circle as $U=\{(\omega_i, cnt_i/cnt) | 1<=i<=a\}$, wherein U is the feature information of the circle, $\omega_i$ is an i-th keyword in different keywords included in the circle shared contents, $cnt_i$ is times of occurrences of the i-th keyword in the circle shared contents, cnt is a sum of the times of occurrences of the different keywords in the circle shared contents, a is the number of the different keywords included in the circle shared contents, and i is an integer;

analyzing, by the electronic device, shared contents of each member in a buddy list created by the client user and generating feature information of each member in the buddy list, wherein feature information of a k-th member in the buddy list is defined as $U_K=\{(\omega_{kj}, cnt_{kj}) | 1<=j<=b_k\}$, wherein $U_K$ is the feature information of the k-th member in the buddy list, $\omega_{kj}$ is a j-th keyword in different keywords included in shared contents of the k-th member, $cnt_{kj}$ is times of occurrences of the j-th keyword in the shared contents of the k-th member, $b_k$ is the number of the different keywords included in the shared contents of the k-th member, and j and k are integers;

calculating, by the electronic device, a similarity between the feature information of each member in the buddy list and the feature information of the circle, generating a similarity set, wherein the similarity between the feature information $U_K$ of the k-th member in the buddy list and the feature information U of the circle is defined by $$S_k = \sum_m (cnt_m/cnt) \times cnt_{km},$$

wherein $cnt_m$ is times of occurrences of a m-th keyword in the circle shared contents, wherein the m-th keyword is included in keywords shared by the feature information U of the circle and the feature information $U_K$ of the k-th member in the buddy list, cnt is a sum of times of occurrences of the different keywords of the circle shared contents in the circle shared contents, $cnt_{km}$ is times of occurrences of the m-th keyword in the shared contents of the k-th member, and m is the number of the keywords shared by the feature information U of the circle and the feature information $U_K$ of the k-th member in the buddy list;

generating a recommended buddy of the circle based on the similarity set; and prompting, by the electronic device, the recommended buddy of the circle to the client user.

2. The method of claim 1, wherein the operation of generating the recommended buddy of the circle based on the similarity set comprises:

configuring a member in the buddy list of which a similarity included in the similarity set reaches a defined threshold as the recommended buddy of the circle.

3. The method of claim 1, wherein the operation of generating the recommended buddy of the circle based on the similarity set comprises:

arranging similarities in the similarity set in a descending order; and selecting members in the buddy list corresponding to a predefined number of first similarities as the recommended buddy of the circle.

4. The method of claim 1, wherein the operation of prompting the recommended buddy of the circle to the client user comprises:

deleting a recommended buddy currently existing in the circle; and prompting a remaining recommended buddy of the circle to the client user after the deleting operation.

5. The method of claim 1, wherein the operation of analyzing the shared contents of each member in the buddy list created by the client user comprises:

obtaining the shared contents of each member in the buddy list created by the client user; and performing the context analysis to the shared contents of each member in the buddy list and extracting a keyword included in the shared contents of each member.

6. An apparatus for recommending a buddy to a client user, comprising:

a processor and a non-transitory storage, wherein the non-transitory storage stores one or more computer readable instructions, and the processor executes the computer readable instructions stored in the non-transitory storage to:

analyze shared contents of all members in a circle created by a client user and generate feature information of the circle as $U=\{(\omega_i, cnt_i/cnt)|1<=i<=a\}$, wherein U is the feature information of the circle, $\omega_i$ is an i-th keyword in different keywords included in the circle shared contents, $cnt_i$ is times of occurrences of the i-th keyword in the circle shared contents, cnt is a sum of the times of occurrences of the different keywords in the circle shared contents, a is the number of the different keywords included in the circle shared contents, and i is an integer;

analyze shared contents of each member in a buddy list created by the client user and generate feature information of each member in the buddy list, wherein feature information of a k-th member in the buddy list is defined as $U_K=\{(\omega_{kj}, cnt_{kj})|1<=j<=b_k\}$, wherein $U_K$ is the feature information of the k-th member in the buddy list, $\omega_{kj}$ is a j-th keyword in different keywords included in shared contents of the k-th member, $cnt_{kj}$ is times of occurrences of the j-th keyword in the shared contents of the k-th member, $b_k$ is the number of the different keywords included in the shared contents of the k-th member, and j and k are integers;

calculate a similarity between the feature information of each member in the buddy list and the feature information of the circle, wherein the similarity between the feature information $U_K$ of the k-th member in the buddy list and the feature information U of the circle is defined by $$S_k = \sum_m (cnt_m / cnt) \times cnt_{km},$$

wherein $cnt_m$ is times of occurrences of a m-th keyword in the circle shared contents, wherein the m-th keyword is included in keywords shared by the feature information U of the circle and the feature information $U_K$ of the k-th member in the buddy list, cnt is a sum of times of occurrences of the different keywords of the circle shared contents in the circle shared contents, $cnt_{km}$ is times of occurrences of the m-th keyword in the shared contents of the k-th member, and m is the number of the keywords shared by the feature information U of the circle and the feature information $U_K$ of the k-th member in the buddy list;

generate a similarity set, and generate a recommended buddy of the circle based on the similarity set; and prompt the recommended buddy of the circle to the client user.

7. The apparatus of claim 6, wherein the processor executes the computer readable instructions stored in the non-transitory storage to:

configure a member in the buddy list of which a similarity included in the similarity set reaches a defined threshold as the recommended buddy of the circle.

8. The apparatus of claim 6, wherein the processor executes the computer readable instructions stored in the non-transitory storage to:

arrange similarities in the similarity set in a descending order; and select members in the buddy list corresponding to a predefined number of first similarities as the recommended buddy of the circle.

9. The apparatus of claim 6, wherein the processor executes the computer readable instructions stored in the non-transitory storage to:

delete a recommended buddy currently existing in the circle; and prompt a remaining recommended buddy of the circle to the client user after the deleting operation.

10. The apparatus of claim 6, wherein the processor executes the computer readable instructions stored in the non-transitory storage to:

obtain the shared contents of each member in the buddy list created by the client user; and perform the context analysis to the shared contents of each member in the buddy list and extract a keyword included in the shared contents of each member.

* * * * *